March 18, 1958 J. F. BARRY ET AL 2,827,427
METHOD OF SHAPING SEMICONDUCTIVE BODIES
Filed Dec. 31, 1954 2 Sheets-Sheet 2

INVENTORS J. F. BARRY
N. C. SEELEY
BY
W. H. Wilson, Jr.
ATTORNEY

United States Patent Office 2,827,427
Patented Mar. 18, 1958

2,827,427

METHOD OF SHAPING SEMICONDUCTIVE BODIES

Joseph F. Barry, Quakertown, and Norman C. Seeley, Easton, Pa., assignors to Bell Telephone Laboratories, Incorporated, New York, N. Y., a corporation of New York Application December 31, 1954, Serial No. 479,109

6 Claims. (Cl. 204—143)

This invention relates to the fabrication of semiconductors and more particularly to methods for electrolytically shaping semiconductive bodies.

Many semiconductive signal translating devices presently require small and extremely accurately dimensioned bodies of semiconductive material. For example, it is not at all uncommon to require semiconductive wafers to have surfaces which approach optical flatness, which are parallel and separated considerably less than ten mils. These wafers must, from a theoretical viewpoint, be free of strains in order to have optimum electrical characteristics. Accordingly, their production from a single crystal material has required a series of extremely complex and expensive steps including the sawing of a slice from a massive semiconductive body, the abrasive polishing of the sawed surfaces to remove a substantial portion of the thermally and mechanically strained material, and a series of chemical etches to reveal a strain-free surface and to reduce the slice thickness to that required in the final device. This type of processing is inherently wasteful of material; ordinarily, the yield of useful material is less than five percent.

In view of the above, one object of this invention is to facilitate the production of smooth, strain-free surfaces for semiconductive bodies.

Another object of the invention is to obtain more accurate strain-free cuts than heretofore obtainable by mechanical abrading techniques.

Other objects of this invention are to facilitate the cutting and polishing of semiconductive materials, reduce the number of processing steps required to produce high quality cut surfaces, simplify the equipment employed in cutting, reduce the loss of material in cutting a mass into small bodies of prescribed form, increase the precision obtainable in a unitary cutting and polishing operation, and decrease the expense of high quality cut surfaces.

In accordance with these objects, the invention resides broadly in positioning an electrode defining a fine line in close proximity to but spaced from a semiconductive specimen, flowing electrolyte between the electrode and the specimen, and passing current between the cathodic electrode and the anodic specimen through the electrolyte.

One feature of the invention resides in restricting the relative motion between the specimen being cut and the cutting electrode to that of essentially pure translation in the cutting direction. One technique of maintaining this limited degree of motion is to rigidly support the cutting electrode and maintain it stationary while moving the specimen with respect thereto in the directions necessary to produce the desired cut.

Another feature of this invention resides in maintaining an essentially constant separation between the cutting electrode and the face of the cut in the specimen to reduce variations in the degree of side cutting. A further reduction in the variation of side cutting can be realized by maintaining the ratio of the current per unit length of the cut or current density to the relative velocity between the specimen and the cutting electrode constant.

Another feature of this invention resides in flowing electrolyte over the cutting electrode and the cut face of the specimen to carry away the etching reaction products and to reduce the adhesion of gas bubbles in the region where electrolytic action is concentrated. In some applications it has been found most desirable to direct the electrolyte as a high velocity jet into the kerf resulting from the cutting action.

In one specific aspect of this invention smooth germanium wafers, having a thickness of the order of a mil, can be produced by positioning a stationary, fine wire electrode under tension at a substantial angle with respect to the horizontal, flowing an electrolyte, having a resistivity substantially greater than the resistivity of the germanium specimen to be cut, along the wire, and advancing a germanium specimen toward the wire. The control of the cutting operation is simplified by maintaining as many parameters as possible constant; thus, the electrolyte composition is maintained constant, as is the electrolyte temperature. The cross section of the specimen is rectangular and a flat face is advanced toward the cutting electrode so that it is parallel thereto. A constant voltage or constant current source of etching power is employed and the velocity of advancement is constant and so correlated with respect to the etching current flowing as to maintain a constant separation between the face of the cut and the electrode.

The invention, together with the above and other objects and features thereof, will be more fully appreciated from the following detailed discussion when read in conjunction with the accompanying drawings, in which.

Figure 2:
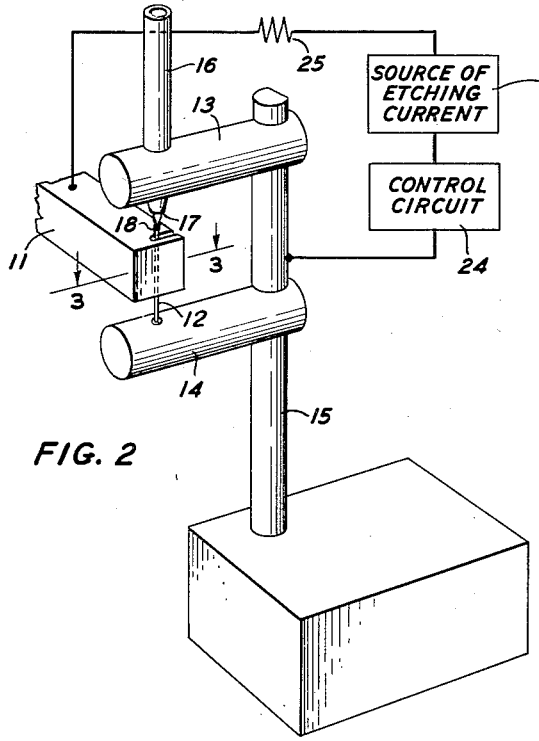
Fig. 2 is an enlarged perspective of the cutting electrode and specimen.
Figure 3:
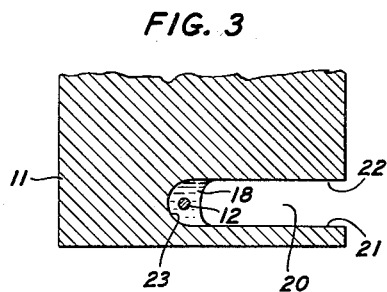
Fig. 3 is a plane view of the cutting electrode and specimen as shown in Fig. 2, taken along the line 3—3 of Fig. 2.

Referring now to the drawings, Figs. 2 and 3 depict the cutting operation as effected on a rectangular germanium bar 11, in accordance with this invention. The cutting electrode 12 is a fine wire of some inert material of good tensile strength, such as tungsten or alloys of gold or platinum, which is maintained stationary and under tension by the clamps 13 and 14, secured to the supporting member 15. An electrolyte is supplied to and caused to flow along the surface of electrode 12 by means of the tubing 16 which may be of glass, which is of reduced dimensions at its lower end so that it closely encompasses electrode 12 and permits only a limited quantity of electrolyte 18 to flow through the orifice 17 between the electrode and its inner walls. Electrical connections are made to the ends of electrode 12, for example at clamps 13 and 14, from the negative side of a unidirectional constant current or constant voltage source 19 which is connected through a control circuit 24 and a limiting resistance 25 to the semiconductive specimen 11.

In effecting the etching operation, the specimen 11 is advanced toward the wire until it is contacted by the electrolyte 18 flowing thereon. Current is then passed between the cathodic electrode and the specimen and the specimen is advanced toward the electrode at a uniform rate. As may be seen from Fig. 3, the kerf 20 which results from this etching operation is the result of an electrolytic action which occurs primarily over a semicircular sector exposed to the leading face of the electrode, and thus it is somewhat wider than the electrode.

In order to maintain the degree of side cutting along the faces 21 and 22 uniform, and thereby produce faces of the required smoothness, relative movement between specimen 11 and electrode 12 transverse of the cutting direction is reduced to a minimum while the electrode is essentially centered between the faces 21 and 22. The degree of side cutting also varies with the etching current density and variations in the rate of movement in the cutting direction of the electrode with respect to the specimen. Idealizing all other variables, side cutting can be maintained constant by maintaining a constant ratio between the current density and the velocity of the cutting electrode with respect to the specimen. Therefore, smooth cuts can advantageously be made by advancing the electrode toward the face of the cut 23 at a uniform rate while the etching current density, and thus the rate of dissolution of the specimen, is maintained constant.

When the cross section of the specimen being cut is irregular, the etching current and/or the velocity of cutting feed can be varied to avoid variations in the ratio and in the amount of side cutting. Thus, as the frontal gap along the electrode length shortens, the current can be reduced and the rate of feed maintained constant, the rate of feed increased and the current maintained constant, or both factors can be adjusted and a uniform degree of side cutting maintained. Conversely, adjustments of these factors in the opposite directions would be in order where the frontal gap is lengthened and uniform side cutting is sought.

The shaping effected by the practice of this preferential etching process is attained by restricting the electrolytic dissolution of material to a region corresponding to the effective shape of the electrode. Etching current is concentrated at the interface between the material being attacked and the electrolyte by employing a high resistivity electrolyte and a short gap between the electrode and specimen. The localization of etching action to a region coresponding in shape to an effective length of electrode is advantageously realized by restricting the gap width to less than about twice the effective width of the electrode. Further, since the rate of cutting at the face of the cut is greatest and the side cutting least when the gap between the electrode 12 and the face 23 is small, this narrow gap should be of uniform width, preferably less than a few mils. It has been found in cutting plane surfaces that variations even of the order of one-tenth of a mil in the position of the electrode 12 transverse of the kerf 20, and similar variations in the gap width or rate of advancement of the electrode with respect to the specimen, produce a surface which has insufficient smoothness for direct utilization in most semiconductive devices. Therefore, extremely rigid mechanical requirements must be placed on the system employed in attaining the relative motion necessary, this motion being essentially pure translation in the direction of the cut.

Extremely high quality surfaces have resulted from cutting a number of different types of semiconductors by this process, for example, a single crystal germanium bar of 2.5 ohm-centimeters resistivity, p-type material having a square cross section of 110 mils on a side, has been sliced into wafers with a thickness as small as one mil employing the following parameters. The electrode 12 was a 3.3 mil tungsten wire maintained vertically and under tension. A solution consisting of 0.002 percent potassium hydroxide by weight in deionized water (less than 0.1 micromho conductivity) was employed as an electrolyte and was caused to flow along the wire at a rate of about ten milliliters per minute. A constant current of 28 milliamperes was employed while the bar was fed toward the electrode at a rate of 6.5 mils per minute to cut a kerf having a width of 7 mils. The resulting surfaces were suitable for fabrication in junction alloy transistors.

In another slicing operation a germanium bar as described above was cut by advancing the electrode toward the face of the cut at 12.5 mils per minute, while drawing 78 milliamperes. The electrolyte in this instance was of higher conductivity, consisting of .0045 percent by weight of potassium hydroxide in 0.1 micromho, deionized water. A kerf .0095 inch wide resulted.

The etching efficiency is reduced and the loss of material in the kerf increased when cutting is performed at faster rates. One measure of the etching efficiency which has been termed the "etching factor" of the process and is defined as the product of the velocity of cutting and the area of the cut, divided by the etching current, illustrates the difference between the two examples. The etching factor with the first set of parameters is 0.179 $(10^{-6})$ cubic inch per milliampere minute while that for the second is 0.167 $(10^{-6})$ cubic inch per milliampere minute.

N-type single crystal germanium of 2.5 ohm-centimeters resistivity in a square bar 90 mils on a side, has been sliced with a 3.3 mil tungsten wire in a solution of .002 percent by weight potassium hydroxide in .05 to .1 micromho deionized water at a rate of 7 mils per minute and a current of 40 milliamperes. The kerf resulting from this cutting was 7 mils wide and the etching factor for this process is 0.11 $(10^{-6})$ cubic inch per milliampere minute. The kerf resulting from this process can be narrowed to about 5 mils by employing a one mil tungsten wire. A more highly polished surface generally can be obtained by employing a higher resistivity electrolyte and a lower etching current. The above n-type surfaces were more polished when cut with a .00087 percent by weight potassium hydroxide solution and a current of 20 milliamperes at a cutting velocity of about 4.9 mils per minute. As in the case of p-type material, the etching factor increases at lower currents, in this case to 0.154 $(10^{-6})$ cubic inch per milliampere minute.

A number of variants are present in this electrolytic cutting method. While the degree of cutting can be affected by changing them either singly or in combination, it is preferable to maintain those having the more complex effects or those which are more difficult to accurately control as constants. Thus, the temperature at which the process is carried out can advantageously be maintained constant to avoid variations in conductivity of the etching circuit and in the mechanical dimensions and relative position of elements of the apparatus. The composition of the electrolyte should be maintained constant by avoiding contamination prior to its use, by continuously replacing that in the portion of the system where etching takes place, by continuously agitating the supply where there is a tendency for constituents to separate, and by using it only once.

With regard to the electrolyte chosen for a process, a wide range of materials are suitable including a number of basic and acid solutions. It is desirable that the electrolyte have the lowest conductivity which will carry the required etching current so that the etching action is concentrated at the frontal gap. Therefore, it is usually of quite low concentration. The electrolyte should have no appreciable effect upon the specimen in the absence of etching current, it should result in a reaction product of the material being cut which is soluble therein, and it should not react with the materials of the apparatus in which it is employed. In instances where the electrolyte wets the electrode or specimen only with difficulty, a detergent can be added as a wetting agent. Typical of those electrolytes which are suitable for cutting germanium are weak aqueous solutions of the alkali hydroxides, hydrochloric acid, sulfuric acid, potassium chloride, and potassium nitrite.

Another factor in this cutting process is the flow rate of the electrolyte to the cutting region. This rate is sufficient to avoid the accumulation of contaminated electrolyte in the cutting region when gravity flow is employed along a cutting electrode which is a substantial angle from the horizontal, greater than about 45 degrees, and the stream is restricted in extent to that cross section which will sustain itself on a length of an electrode only a few mils thick. However, it has been found advantageous, particularly in the cutting of n-type germanium, to employ streams flowing at somewhat greater velocities in order to break loose and carry away from the surface being cut the bubbles produced by the electrolytic action. Occasionally these surfaces have been pitted when bubbles have been permitted to accumulate and the pitting has been markedly reduced or eliminated by employing a stream of electrolyte.

Another function of a flowing electrolyte, particularly when directed with some force into the kerf of the cut, is to overcome the forces tending to cause the severed element to cling to the semiconductive body and to cause the element to fall clear of the cutting mechanism, for example into the tank 41 in which the spent electrolyte is caught. A suitable electrolyte velocity for this cutting process is about 225 centimeters per second. When a jet of electrolyte is applied to the cutting area at high velocities, it is desirable to protect the cutting feed mechanism from spray with a plastic shield or a suitable protective coating.

In making cuts having a uniform kerf width, the rate of advance of the electrode toward the specimen is usually maintained uniform and is determined by the current density being employed. One of the factors which limits the cutting rate is the voltage breakdown of the electrolyte. Cuts have been made in a specimen 50 mils square at a rate of 17 mils per minute. In the case of 2.5 ohm-centimeters, p-type, single crystal germanium, the optimum range of cutting velocities is from about 7 to 12 mils per minute. Side cutting can be varied where desired in shaping a body by maintaining a uniform current density and varying the rate of advancement of the electrode toward the cutting face. A decrease in the feed rate permits a greater degree of side cutting to occur and an increase in the rate reduces side cutting. Thus, a degree of shaping of the surface produced by the cutting operation can be attained even with relative movement between the electrode and specimen restricted to a straight line. When large curves are to be generated in the cut surface by the cutting electrode, they can be produced by moving the specimen with respect to the electrode along other than a straight path.

Figure 4:
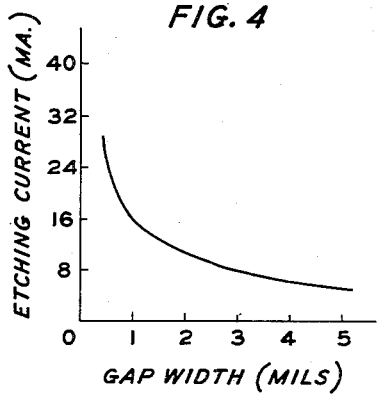
Fig. 4 is a curve, showing the relationship of the etching current at the face of the cut to the separation of the electrode from that face for a fixed etching potential.

Electrolytic cutting by this process is self-equalizing with regard to the cutting gap and thus side cutting when it is accomplished with a constant voltage source and a suitable limiting resistance. As illustrated in Fig. 4, an inverse relationship between etching current and gap width exists in a system operated from a constant voltage source. Since etching current, as depicted in Fig. 4, corresponds to the rate of dissolution of material, it is apparent that with a narrow frontal gap material will be removed to a greater extent in the cutting direction and a lesser extent in the transverse direction. When the etching system is employed with a constant feed rate which is so correlated with the rate of dissolution of material at the face that a small frontal gap is established (less than a few mils) this gap will be maintained due to the steep relationship between gap width and material dissolution. For example, if for some reason the rate of dissolution should tend to decrease, perhaps due to the cutting face entering a region in the specimen of increased resistivity, then the constant rate of advancement of the cutting electrode would cause the gap width to decrease. As may be seen from Fig. 4, this would tend to increase sharply the etching current and thus the dissolution rate at the face of the cut, thereby causing the face to be cut at a more rapid rate and to advance at a greater velocity than the cutting electrode. As the gap increased, the etching current would tend to decrease, and the velocity at which the face was cut would decrease until the equilibrium velocity again prevailed and the cutting face advanced with with the same velocity as the cutting electrode to maintain a constant frontal gap. Conversely, as the gap tends to increase the etching current and rate of dissolution at the cutting face decreases, reducing the velocity of advancement of the cutting face to less than that of the cutting electrode until the gap is reduced to its equilibrium value. P-type, single crystal germanium of 2.5 ohm-centimeters resistivity has been cut at from 7 to 12 mils per minute with this gap equalizing technique using 0.002 percent potassium hydroxide and a 3.3 mil tungsten electrode with a constant 100 volts applied across the electrolyte.

While the self-equalizing feature is present in all systems operating with a narrow effective electrode, it is to be understood that the characteristic depicted in Fig. 4 is merely illustrative and that the values will be other than those shown for some systems. It is further to be understood that current in Fig. 4 corresponds to the effective current density at the frontal gap, a more general measure of rate of dissolution of material which is applicable where the length of the cut varies. The relative magnitudes of etching current illustrated in Fig. 4 were obtained in making a series of cuts 110 mils long with a 4 mil platinum wire, and a .002 percent potassium hydroxide solution running along the wire, on a germanium sample using a 90 volt source of etching current. At a feed rate of 7 mils per minute and an etching current of 50 milliamperes the frontal gap between a one mil platinum wire carrying a .002 percent potassium hydroxide solution has been found to remain constant at 0.7 mil.

Another method for maintaining the frontal gap between the cutting electrode and the specimen is to apply a coating of insulating material to the cutting electrode having a thickness corresponding to the gap width and maintaining that coating in contact with the frontal face of the cut. This coating material must be such as to conduct a sufficient quantity of electrolyte to support the electrolytic cutting action between the electrode and specimen within its interstices.

The advantages of this electrolytic shaping process when applied in semiconductor fabrication, will be appreciated when it is realized that no further processing of the surfaces resulting is necessary prior to their fabrication into devices. Kerf widths of less than 5 mils can be obtained, increasing the efficiency of material utilization of this process to 50 percent when 5 mil wafers are being produced.

Figure 1:
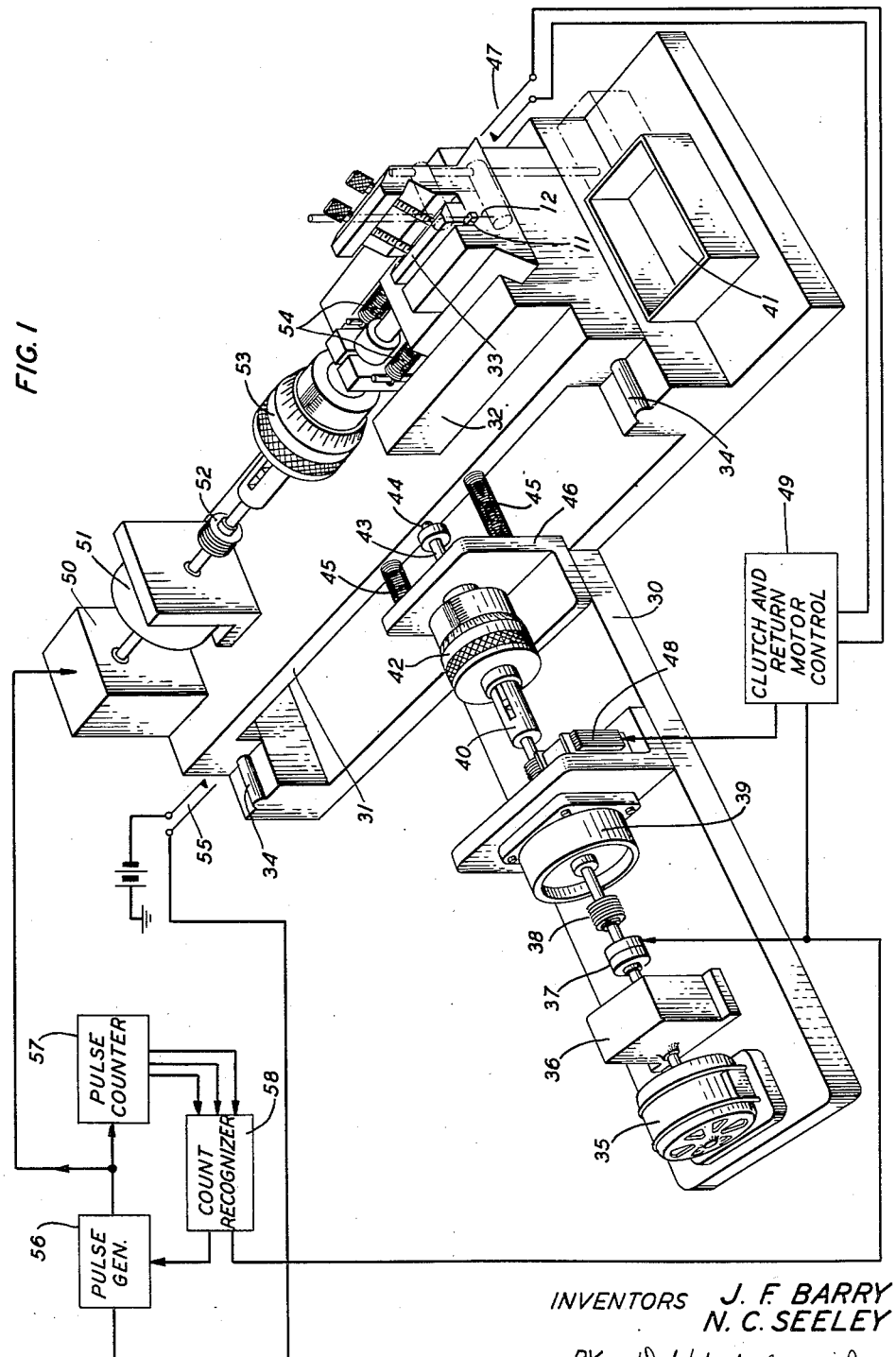
Fig. 1 shows typical equipment for slicing semiconductive wafers, the mechanical elements being shown in perspective and the electrical control circuits being shown in block diagram form.

One form of apparatus for automatically slicing wafers to the form described above is shown in Fig. 1. This apparatus rigidly supports a bar-shaped specimen 11 so that a portion projects beyond the apparatus to a position which permits engagement with a cutting electrode 12. It provides the precise relative motion between the bar and the electrode which is required for the slicing operation by advancing the bar past the stationary electrode. It retracts the specimen after a slice has been cut therefrom, advances the bar along its axis a predetermined distance corresponding to the thickness of the next slice to be cut, and then recycles itself, all automatically. Structurally it comprises a T-shaped base member 30 having on its arms a cross slide table 31 which supports a slide 32 for a bar vise 33, arranged so that it can be moved in a direction parallel to the bar axis. The cross slide table 31 is mounted in sliding relationship on rails 34 secured to the arms of base member 30 so that it is movable transverse of the bar axis. A precision driving train is mounted on the leg of the T of the base member. It is powered by a constant speed motor 35 which runs continuously. This motor is coupled directly to a reduction gear 36 to drive through a magnetic clutch 37 and flexible coupling 38, a precision reduction gear 39. The slow and uniform rotational motion of this train drives an optical micrometer head 42 through a precision coupling 40 which permits axial motion without rotational play. A shaft 43 from micrometer 42 bears against the center of the cross slide 31 by means of a ball coupling 44. This mechanical train drives the cross slide table 31 across the arms of the T of base plate 30 at a uniform rate of the order of mils per minute without any transverse movement. A pair of balanced return springs 45 are secured under tension to bracket 46 on base plate 30 and to the cross slide table at points on the line through the center of ball coupling 44 and equidistant therefrom. These springs provide the retracting force for the cross slide table and a uniform force opposing the table feed which is large compared to the frictional forces encountered. Thus, the spring forces mask variations in the frictional forces and increase the uniformity of the table feed.

When the cross slide has made a traverse and a slice has been cut from the bar 11 in the vise 33, the slice falls into basin 41 and the cross slide table actuates, as by means of a microswitch 47, a control circuit 49 which disengages magnetic clutch 37 in the driving train, and then actuates quick return motor 48, thereby retracting the cross slide table.

Proper indexing of the semiconductor bar prior to the next cutting cycle is accomplished by the mechanical train mounted on the cross slide table driving the semiconductor bar vise 33 in its slide 32. This indexing mechanism comprises a solenoid operated ratchet 50 which produces rotational movement for driving a precision reduction gear 51 coupled by a flexible coupling 52, to an optical micrometer head 53 associated with the bar vise 33 by a ball connection (not shown) and vise return springs 54, similar in form to the coupling between the cross slide table 31 and its drive.

The operation of this indexing mechanism is initiated by the retraction of the cross slide table which closes a microswitch 55 to initiate the generation of pulses from a pulse generator 56 which may, for example, be a blocking oscillator. This pulse generator supplies pulses which cause the ratchet mechanism 50 to operate. At the same time a portion of each pulse is fed to a pulse counter 57 which may be of conventional electronic or electromechanical form, for example, of the decade type, and a count or pulse recognizer 58 connected thereto. The pulse recognizer is arranged to be set at any predetermined pulse count and to terminate the operation of the pulse source when that count has been generated. In a combination of this type a pulse source arranged to supply pulses at the rate of about ten per second to the ratchet mechanism 50 which drives the micrometer screw, will function as follows: with a ratchet mechanism provided with a twenty-tooth ratchet wheel and coupled to a micrometer which has forty threads per inch on its lead screw by the 25:1 reduction gear 51, the combination gives .00005 of an inch advancement of the bar vise for each step of the ratchet wheel. Thus, the semiconductor bar may be stepped forward after each cut at the rate of one mil every two seconds in .00005 inch increments.

After terminating the indexing operation, the pulse recognizer connected to the counting circuit initiates the next cutting cycle by engaging the clutch 37 to couple the continuously running motor 35 to the driving train for cross slide table 31. This control enables semiconductive elements to be cut with the apparatus of Fig. 1 completely automatically, inasmuch as the circuits are equipped with trouble indicating auxiliary circuits (not shown) to call an operator and to automatically recycle the equipment. Thus, should it ever malfunction, for example by the string electrode shorting out against the semiconductor bar to stop the etching action, a monitoring means in the etching circuit automatically recycles the cutting equipment by retracting the cross slide table actuating the bar indexing control and initiating a new cut to correct the difficulty.

The described slicing techniques and apparatus lend themselves to numerous modifications and to other than the straight slicing of a specimen. In those instances where a large number of wafers are to be produced several cuts can be made simultaneously by employing a plurality of electrodes and a suitable etching circuit. The electrodes for multiple cutting can advantageously be staggered in the cutting direction so that a number of wafers may be severed at the same time.

Figure 5:
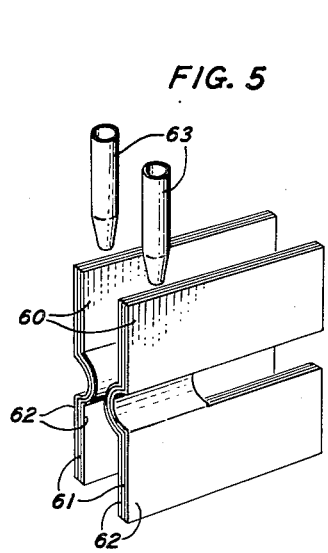
Fig. 5 is a perspective view of a pair of electrodes for cutting nonplanar surfaces in accordance with this invention.

A variety of shapes can be formed electrolytically by employing a relative movement between electrode and specimen during etching which traces the desired pattern. The cutting electrode can be of a number of shapes which produce other than straight kerfs. A pair of electrodes 60, suitable for cutting an irregular cross section transverse of the cutting direction for field effect transistors, is shown in Fig. 5. Since it is desirable that vibration be reduced in the electrode to a minimum, to avoid variations in the degree of side cutting, it is advantageous, where other than straight cuts are to be made, to incorporate some degree of rigidity into the electrode per se. Rigidity can be attained with the electrode structure of Fig. 5 while maintaining a restricted effective portion of the electrode at the cutting face by employing a metallic sheet member corresponding in shape in the dimensions of its major face to the configuration sought to be cut. The effective portion of the electrode is restricted to the ribbon edge 61 by applying a thin insulating coating 62 over all other portions of the ribbons but those edges which are in proximity to the semiconductor and are contacted by electrolyte from nozzles 63 during the cutting operation. One method of forming these electrodes is to mechanically work them to the desired configuration, then coat them with an insulating film 62 which is not affected by the electrolytic action and is thin enough to pass through the kerf formed in cutting, e. g., about 1 or 2 mils thick, and then to remove the insulation from the leading edge of the electrodes 61 as by grinding. A number of materials can be employed for the film, for example electrical nylon, ethyl cellulose, or Formvar, are suitable.

While the above discussion has been directed in the main to electrolytic shaping of germanium by maintaining a long, thin electrode in close proximity to a germanium surface while current is passed through an electrolyte flowing therebetween, it is to be understood that this process is also applicable to other semiconductors such as silicon, silicon-germanium alloys, intermetallic compounds such as the group III-group V materials indium-antimonide, aluminum-arsenide, gallium-phosphide, and the like. Further, the processes of this invention are suitable for the electrolytic shaping of conductive materials such as hard, cutting tool metals.

It is to be understood that the above-described arrangements are illustrative of the application of the principles of the invention. Numerous other arrangements may be devised by those skilled in the art without departing from the spirit and scope of the invention.

What is claimed is:

1. The method of producing a strain-free planar cut in a germanium body which comprises rigidly supporting a stationary thin straight wire electrode, applying a stream of electrolyte along the length of the electrode, limiting the extent of the electrolyte on the electrode to that sustained thereon by adhesive and surface tension forces, forming a rectangular bar of germanium, securing the bar on a movable carriage with its axis perpendicular and one face parallel to the electrode, applying a potential between the bar and the electrode, advancing the bar toward the electrode along a straight path perpendicular to its axis and intersecting the electrode at a uniform rate, and passing a constant current through the electrolyte and between the anodic bar and the cathodic wire of sufficient magnitude to maintain a gap between the electrode and the bar.

2. The method of producing a strain-free planar surface on a germanium body which comprises rigidly mounting a thin straight wire under tension, flowing a sheath of electrolyte along said wire, said sheath being limited in extent on said wire to that sustained thereon by adhesive and surface tension forces, advancing said body toward said wire along a straight path at a uniform rate, and passing an etching current between the anodic body and the cathodic wire through the electrolyte.

3. The method of shaping a conductive member which comprises mounting a thin electrode with sufficient rigidity to retain its desired shape, mounting the body in proximity to said electrode, flowing a stream of electrolyte along a length of said electrode, limiting the extent of said stream on said electrode to that sustained thereon by adhesive and surface tension forces, passing an etching current between the anodic body and the cathodic electrode through the flowing electrolyte, and maintaining the gap between the electrode and the face of the cut in the body resulting from the passage of etching current substantially constant throughout the electrolytic cutting operation.

4. The method of cutting a germanium body which comprises supporting an elongated electrode in a fixed position, flowing a stream of gravity impelled electrolyte along said electrode, limiting said stream of electrolyte on said electrode to that sustained thereon by adhesive and surface tension forces, applying a potential between said electrode and said germanium body, advancing said body along a cutting path intersecting said electrode, and passing a fixed current per unit length of cut along said electrode between the cathodic electrode and the anodic body which is sufficient to maintain said electrode out of contact with said body.

5. The method of cutting a germanium body which comprises mounting a thin fine wire stationary and under tension at a substantial angle from the horizontal, flowing a stream of gravity impelled electrolyte, limited in extent to that sustained by adhesive and surface tension forces, along said wire, advancing said body along a path which intersects said wire to engage said stream of electrolyte, and passing a current between said anodic body and said cathodic wire through said electrolyte, the ratio of the effective current density to the rate of advancement of said body toward said wire being maintained constant.

6. The method of shaping a member of conductive material which comprises mounting a stationary thin electrode having a substantial length rigidly to retain its shape and position, moving the member and electrode with respect to each other and into each other at a uniform rate, flowing a stream of electrolyte over the length of said electrode, confining the extent of the stream of electrolyte on the electrode to that sustained thereon by adhesive and surface tension forces, and passing an etching current from a constant voltage source through the electrolyte between the anodic member and the cathodic electrode whereby the frontal gap between said member and said electrode remains essentially constant.

References Cited in the file of this patent

UNITED STATES PATENTS 2,526,423    Rudorff _____ Oct. 17, 1950

FOREIGN PATENTS 335,003    Great Britain _____ Sept. 18, 1930

OTHER REFERENCES

Proc. of the I. R. E., December 1953, pp. 1706–8. Tiley et al., vol. 41, No. 12.

U. S. Atomic Energy Comm. Bull. NYO–3166, November 1, 1951, Kehl et al. (28 pages).